(No Model.)
J. S. MACKIE.
MOTOR.
No. 526,928. Patented Oct. 2, 1894.
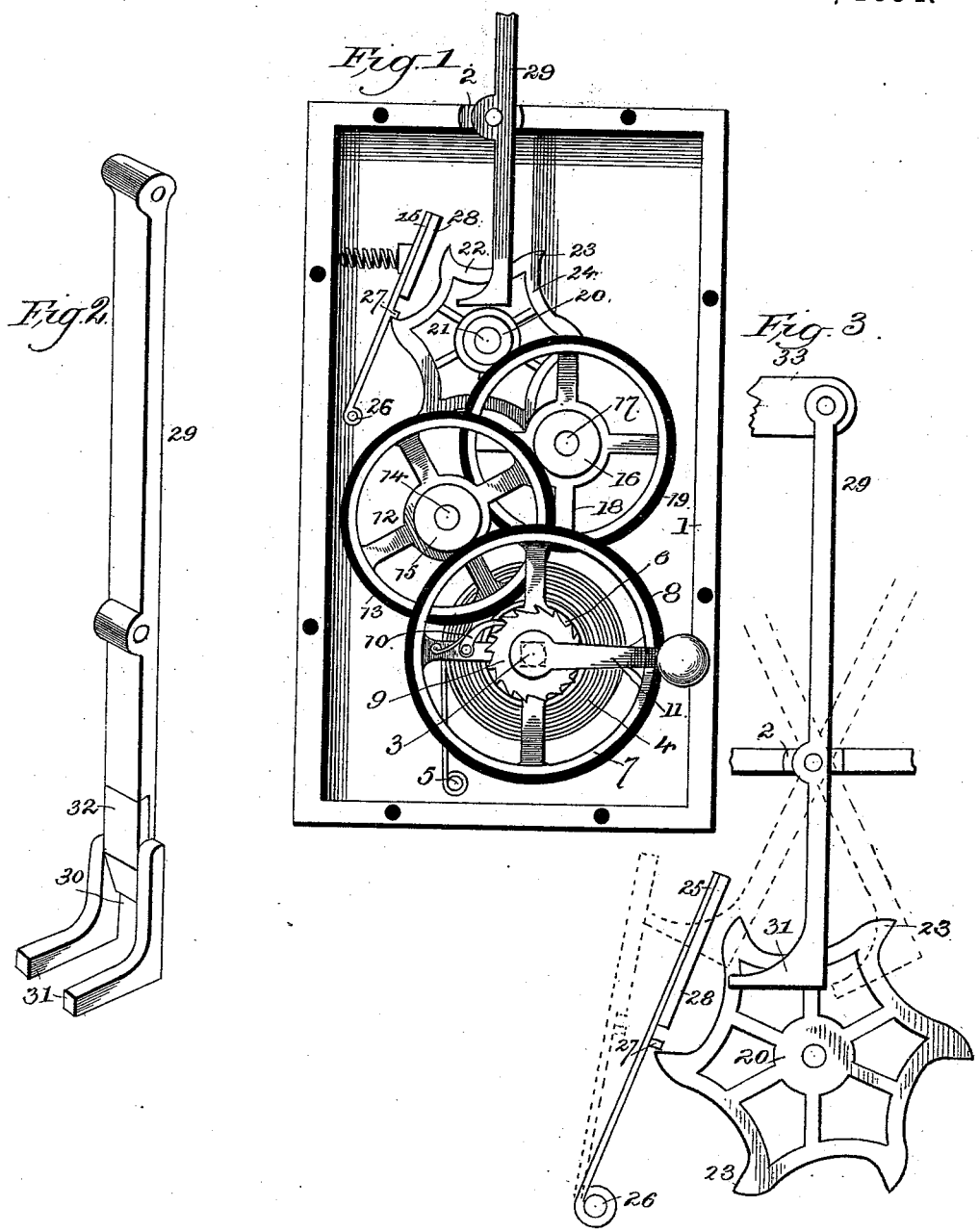
Witnesses
J. W. Reynolds
Chas. S. Hoyer
Inventor
James S. Mackie
By John Wedderburn
Attorney

UNITED STATES PATENT OFFICE.

JAMES S. MACKIE, OF BARRE, VERMONT.

MOTOR.

SPECIFICATION forming part of Letters Patent No. 526,928, dated October 2, 1894.

Application filed November 10, 1893. Serial No. 490,530. (No model.)

*To all whom it may concern:*

Be it known that I, JAMES S. MACKIE, a citizen of the United States, and a resident of Barre, in the county of Washington and State of Vermont, have invented certain new and useful Improvements in Motors; and I do hereby declare the following to be a full, clear, and exact description of the invention, such as will enable others skilled in the art to which it appertains to make and use the same.

This invention relates to a motor adapted for operating various devices such as fans, cradles, and other articles, and has for its object to provide a noiseless motor, having a positive action and a simple construction, being operated by a frictional engagement, with sound deadening material interposed between the parts.

With these and other objects in view the invention consists of the construction and arrangement of the several parts, which will be more fully hereinafter described and claimed.

In the drawings: Figure 1 is a sectional perspective view of a motor, embodying the invention. Fig. 2 is a detail perspective view of the operating lever. Fig. 3 is a side elevation of the operating lever and the escapement, showing the mode of operation.

Similar numerals of reference are employed to indicate corresponding parts in the several views.

Referring to the drawings, the numeral 1 designates a suitable casing, having a slot or opening in one end or side thereof, as at 2. Within the said casing is mounted a main drive shaft or arbor 3 upon which is adapted to wind a flat spring 4 secured at one end of the box or casing as at 5, and also having a metal disk 6 thereon.

Adjacent to the metal disk is mounted a main driving wheel 7, supplied with a rubber tire, or rim 8 and outside of the said wheel 7 is a ratchet wheel 9 keyed to the said shaft and adapted to be engaged by a spring actuated pawl 10, connected to the said wheel 7. The outer end of the shaft is provided with a crank 11, which is located on the exterior portion of the casing and is adapted for winding the spring 4, the latter being held in its wound position by the ratchet 9, and pawl 10, as will be readily understood.

A wheel 12, with a rubber rim or tire 13 frictionally engages the metal disk 6, on the shaft 3 and the said wheel 12 is of itself mounted upon a shaft or spindle 14 which carries a metal disk 15, adjacent to the hub of the said wheel 12, in frictional engagement with the rubber tire or rim 8 of the wheel 7. The rubber tire or rim of the wheel 12, in turn engages another metal disk 16, mounted on a shaft or spindle 17, below the shaft or spindle 14, and in advance of the previous named shafts, and the said shaft 17 has also mounted thereon a wheel 18, provided with a rubber rim or tire 19.

The rubber rim or tire 19 of the wheel 18, engages a front disk 20 of metal, which is mounted on a shaft or spindle 21, said shaft or spindle 21 also having thereon an escape wheel 22 with engaging teeth 23 between which is a long shoulder or arm 24. Engaging the teeth of the said escape wheel 22 is a pawl or pallet 25, which is pivoted at its rear end as at 26, and has an under tooth 27 to engage the teeth 23, and in advance of the said tooth 27 is a rubber pad or cushion 28 to avoid noise consequent from the said pawl or pallet falling from the escape wheel and the said teeth 27 may be in like manner covered with rubber to produce a noiseless action.

Extending inwardly through the slot 2 in the end of the casing is a lever 29, whose inner end is bifurcated as at 30 to embrace a portion of the escape wheel 22 without touching the same at any point and is supplied with upwardly projecting arms 31 which strike against the rubber pad 28 of the pallet or pawl 25 and raise the same, and disengage the tooth 27 from one of the teeth 23 to permit the resilient action of the spring 4 to influence the several wheels enumerated and permit the escape wheel to be revolved and the tooth 23 nearest the said lever 29 to strike the said lever, which at the forward termination of its bifurcation 30 is beveled as at 32, to allow the tooth 23, engaging the said lever, to ride freely thereon, in a downward movement to force the lever 29 in the opposite direction as fully and clearly shown by dotted positions in Fig. 3. This operation becomes continuous after first starting the lever by the combined action of the spring 4, and the tendency of the lever 29 to return to its normal position by gravity which is caused and superinduced by the gravitating action of the parts to which the said lever is connected, and by this means an easy swaying or oscillating movement of the operated device is acquired without jerking or jarring, and in a perfectly noiseless manner.

The beveled portion 32 of the front termination of the bifurcation 30 is formed of wood and consists of a block of such material or other analogous substance which is fitted snugly in a recess formed at the said point and also serves to deaden the noise, which would otherwise result from the contact of the teeth 23, with the metal of the lever 29. The said lever 29 is pivoted in the slot 2 and to the outer end thereof is attached a bar or pitman 33 which may be led to a fan, cradle or other device. The pawl or pallet 25 in this instance, acts as a catch to hold the escape wheel 22 against movement, until the arms 31 of the said lever 29 strike the rubber pad 28, and release the tooth 27 from engagement with the adjacent tooth 23 of the escape wheel and the teeth 23 are so positioned that they will come in line and engage the tooth 27, the said pawl or pallet 25 swinging from its pivot always being in position to insure such engagement.

The device can be made to run any length of time in accordance with the length of the spring 4 and the size of the intermediate wheels and it will be understood that changes within the scope of the invention may be made and substituted for those set forth without in the least departing from the nature or spirit of the invention.

To hold the pallet or pawl 25 in engagement with the escape wheel, a repellent spring 34 is employed, and is secured to the said pallet or pawl and to the adjacent portion of the casing.

Having thus described the invention, what is claimed as new is—

1. In a motor, the combination of a series of wheels having rubber covers on their peripheries, a spring for operating said wheels, a series of metal disks engaging said wheels, an escape wheel having one of said disks on its shaft engaging one of said wheels, a pawl or pallet engaging said escape wheel, and a lever having a bifurcated inner end embracing said escape wheel and adapted to be operated thereby and also provided with outwardly projecting arms to engage said pawl or pallet, substantially as described.

2. In a motor, the combination of a series of rubber covered wheels arranged in succession as a train, a series of metal disks on the shafts of said wheels and engaged by the rubber coverings of the latter, an escape wheel, a pawl or pallet adapted to engage the teeth of said escape wheel, and having a rubber pad thereon, a bifurcated lever having a wooden block at the front termination of its bifurcation and adapted to be engaged by the escape wheel, and arms at the rear to strike the said rubber pad of the pawl or pallet, said escape wheel moving through the bifurcation of the lever, and a spring for operating the said parts, substantially as described.

In testimony whereof I have signed this specification, in the presence of two subscribing witnesses.

JAMES S. MACKIE.

Witnesses:
F. HOWLAND,
D. P. TOWN.